US009694327B2

(12) United States Patent
Takahashi et al.

(10) Patent No.: US 9,694,327 B2
(45) Date of Patent: Jul. 4, 2017

(54) HOLLOW POROUS MEMBRANE (71) Applicant: Mitsubishi Rayon Co., Ltd., Chiyoda-ku (JP)

(72) Inventors: Shusaku Takahashi, Toyohashi (JP); Takahito Ooba, Toyohashi (JP); Masashi Teramachi, Toyohashi (JP)

(73) Assignee: Mitsubishi Rayon Co., Ltd., Chiyoda-ku (JP)

( * ) Notice: Subject to any disclaimer, the term of this patent is extended or adjusted under 35 U.S.C. 154(b) by 234 days.

(21) Appl. No.: 14/404,572

(22) PCT Filed: May 31, 2013

(86) PCT No.: PCT/JP2013/065204
§ 371 (c)(1),
(2) Date: Nov. 28, 2014

(87) PCT Pub. No.: WO2013/180272
PCT Pub. Date: Dec. 5, 2013

(65) Prior Publication Data
US 2015/0108060 A1    Apr. 23, 2015

(30) Foreign Application Priority Data

Jun. 1, 2012   (JP) .................................. 2012-125875

(51) Int. Cl.
*B01D 39/00*   (2006.01)
*B01D 39/14*   (2006.01)
(Continued)

(52) U.S. Cl.
CPC ............. *B01D 71/34* (2013.01); *B01D 69/02* (2013.01); *B01D 69/08* (2013.01); *B01D 69/12* (2013.01);
(Continued)

(58) Field of Classification Search
CPC ........ B01D 71/34; B01D 69/08; B01D 69/10; B01D 53/228; B01D 69/02; B01D 71/32; B01D 2325/24
See application file for complete search history.

(56) References Cited

U.S. PATENT DOCUMENTS 5,017,292 A      5/1991  DiLeo et al.
5,472,607 A  *  12/1995  Mailvaganam ........ B01D 69/08
                                                                    210/490
(Continued)

FOREIGN PATENT DOCUMENTS

CN    101439268 A    5/2009
CN    102366714 A    3/2012
(Continued)

OTHER PUBLICATIONS

Combined Office Action and Search Report issued Aug. 28, 2015 in Chinese Patent Application No. 201380039484.4 (with partial English language translation).
(Continued)

*Primary Examiner* — Ana Fortuna
(74) *Attorney, Agent, or Firm* — Oblon, McClelland, Maier & Neustadt, L.L.P.

(57) ABSTRACT

A hollow porous membrane of the present invention comprises a plurality of porous membrane layers, at least two layers of which are formed using a thermoplastic resin (a) having a mass average molecular weight of 500,000 or more, and the hollow porous membrane having a bursting pressure of 200 kPa or more when an internal pressure is applied and exhibiting virus removal performance of LRV 4 or more in the case of using MS2 phage as a test bacterium.

15 Claims, 3 Drawing Sheets

(51) Int. Cl.
  *B01D 29/00* (2006.01)
  *B01D 71/34* (2006.01)
  *B01D 69/08* (2006.01)
  *B01D 69/02* (2006.01)
  *B01D 69/12* (2006.01)

(52) U.S. Cl.
  CPC ...... *B01D 2325/20* (2013.01); *B01D 2325/24* (2013.01); *B01D 2325/34* (2013.01); *B01D 2325/40* (2013.01)

(56) References Cited

U.S. PATENT DOCUMENTS

| | | | |
|---|---|---|---|
| 6,354,444 | B1 | 3/2002 | Mahendran et al. |
| 7,306,105 | B2 * | 12/2007 | Shinada ............ B01D 71/34 210/483 |
| 7,455,772 | B2 * | 11/2008 | Tada ............ B01D 67/0011 210/500.23 |
| 2005/0205488 | A1 | 9/2005 | Shinada et al. |
| 2006/0180544 | A1 * | 8/2006 | Kools ............ B01D 67/0009 210/490 |
| 2008/0292823 | A1 | 11/2008 | Lee et al. |
| 2011/0114553 | A1 * | 5/2011 | Teramachi ............ B01D 69/08 210/490 |
| 2012/0273409 | A1 * | 11/2012 | Seo ............ B01D 69/08 210/500.23 |

FOREIGN PATENT DOCUMENTS

| | | |
|---|---|---|
| EP | 1 609 522 A2 | 12/2005 |
| EP | 2 301 654 A1 | 3/2011 |
| EP | 2 332 639 A1 | 6/2011 |
| EP | 2 868 367 A1 | 5/2015 |
| JP | 53 104578 | 9/1978 |
| JP | 62-79806 | 4/1987 |
| JP | 4-505579 | 10/1992 |
| JP | 2003 311133 | 11/2003 |
| JP | 2006-224051 | 8/2006 |
| JP | 2007 83239 | 4/2007 |
| JP | 2008 114180 | 5/2008 |
| JP | 2008-296220 | 12/2008 |
| JP | 2009 517200 | 4/2009 |
| JP | 2009-219979 | 10/2009 |
| JP | 2010-94670 | 4/2010 |
| JP | 2011 36848 | 2/2011 |
| JP | 2012-40464 A | 3/2012 |
| JP | 2013-63383 A | 4/2013 |
| JP | 2013 128865 | 7/2013 |
| WO | WO 91/16968 A1 | 11/1991 |
| WO | WO 2009/142279 | 11/2009 |

OTHER PUBLICATIONS

Office Action mailed Dec. 15, 2015 in co-pending U.S. Appl. No. 14/410,765.
Office Action issued Dec. 18, 2015 in European Patent Application No. 13797685.8.
U.S. Appl. No. 14/410,765, filed Dec. 23, 2014, Takahashi, et al.
International Search Report Issued Oct. 1, 2013 in PCT/JP13/067679 Filed Jun. 27, 2013.
International Search Report issued Aug. 13, 2013 in PCT/JP2013/065204 (with English translation).
Office Action issued May 7, 2014 in Japanese Patent Application No. 2013-528149 (with English translation).
Office Action issued Jan. 27, 2015 in Japanese Patent Application No. 2013-528149 (with English translation).
http://www.basf.com/group/corporate/en/literature-document:/Brand+Luvitec-Brochure-PVP+and+more+Versatile+specialty+polymers+for+technical+applications-English.pdf.
Extended European Search Report issued May 28, 2015 in Patent Application No. 13809267.1.
Extended European Search Report issued Aug. 17, 2015 in Patent Application No. 13797685.8.

* cited by examiner

HOLLOW POROUS MEMBRANE

TECHNICAL FIELD

The present invention relates to a hollow porous membrane which is suitably used in the water treatment.

This application is based upon and claims the benefit of priority of the prior Japanese Patent Application No. 2012-125875, filed on Jun. 1, 2012, the entire contents of which are incorporated herein by reference.

BACKGROUND ART

In recent years, the water treatment using a membrane filter excellent in completeness of separation and compactness has attracted attention since interest in environmental problems has increased and also the regulations on water quality have been tightened. As the membrane filter, for example, a hollow porous membrane is used and employed in a variety of water treatment such as the sewage and wastewater treatment or the water purification treatment.

Hollow porous membranes with various configurations have been investigated. For example, there is a hollow porous membrane in which a braid support formed by circular knitting the yarn into a cylindrical shape is used as a support for a hollow porous membrane (hereinafter, simply referred to as the support in some cases) and a porous membrane layer is provided on the outer circumferential surface thereof. The hollow porous membrane is produced as follows, for example. First, a membrane forming solution is discharged from a double pipe spinning nozzle when the support continuously passes through the double pipe spinning nozzle so that the membrane forming solution is applied to the outer circumferential surface of the support. Thereafter, the support coated with the membrane forming solution is allowed to pass through a coagulation bath so that the membrane forming solution is coagulated by a coagulating liquid in the coagulation bath. The hollow porous membrane is obtained in this manner.

The hollow porous membrane is required to exhibit excellent separation properties and permeability or high mechanical properties. For example, in the water treatment field, it is required to physically remove the virus having a particle size of about from tens to 50 nm contained in the river or the like because of tightened regulations and the like.

In addition, in a case in which the hollow porous membrane is used together with the activated carbon in various kinds of water treatment or a case in which inorganic particles such as sand are contained in the water to be treated, the filtration performance of the membrane decreases in some cases since the membrane surface comes in contact with the activated carbon or the inorganic particles at the time of the air scrubbing process or the like so that the membrane surface is worn or the activated carbon or the inorganic particles pierce into the membrane surface so as to generate a defective point on the membrane. Hence, the hollow porous membrane is required to has the resistance to such piercing or wear and thus to be able to maintain the virus removal performance even at the time of being used together with the activated carbon or in a case in which inorganic particles are contained in the water to be treated. As the virus removal mechanism, generally, there are sieving (screening) filtration in which the filtration is performed by a sieve having a pore size smaller than the virus, so-called depth filtration in which the virus is trapped in micropores, and the like.

As the hollow porous membrane, for example, a membrane is described in Patent Document 1 in which a separating functional layer which has a three-dimensional network structure and contains polyvinylidene fluoride having a melt viscosity of 2500 Pa·s or more is laminated on a polyvinylidene fluoride-based support layer having a spherical structure. It is described in Patent Document 1 that the membrane exhibits high virus removal performance and physical strength.

In addition, a hollow porous membrane is disclosed in Patent Document 2 which has an outer layer composed of a thermoplastic resin having a mass average molecular weight of 400,000 or more and a soft inner layer composed of a thermoplastic resin having a mass average molecular weight of less than 400,000. It is described in Patent Document 2 that, since the hollow porous membrane has a soft inner layer, the pressing force on the outer surface is dispersed and lowered when the membranes come in contact with each other and thus the abrasion can be diminished.

In addition, a hollow porous membrane is disclosed in Patent Document 3 which has a compact layer on the membrane surface and inside the membrane. It is described in Patent Document 3 that this hollow porous membrane can maintain significantly high safety since the compact layer inside the membrane blocks the removal target substance even if the compact layer on the membrane surface is damaged and thus the removal target substance blocking rate thereof is lowered.

CITATION LIST

Patent Document

Patent Document 1: JP 2010-94670 A
Patent Document 2: JP 2009-219979 A
Patent Document 3: JP 2006-224051 A

SUMMARY OF THE INVENTION

Problem to be Solved by the Invention

However, in the membrane disclosed in Patent Document 1, the resistance to piercing and wear by the activated carbon, the inorganic particles or the like is not sufficient and thus a decrease in virus removal performance caused by such piercing and wear is concerned.

In addition, it cannot be said that the membrane disclosed in Patent Document 2 exhibits sufficient resistance to piercing even though the membrane has the resistance to wear.

In addition, the membrane described in Examples 1 and 2 of Patent Document 3 cannot maintain the performance removing the virus having a particle size of from tens to 50 nm since the original average pore size of the membrane is as large as 80 nm and also the average pore size thereof is changed from 80 nm to 100 nm by the sand drop test.

The invention has been made in view of the above circumstances, and an object thereof is to provide a hollow porous membrane that exhibits the resistance to piercing of activated carbon, inorganic particles or the like into the membrane surface at the time of an air scrubbing process or the like or to wear of the membrane surface by these particles and thus can maintain high virus removal performance.

Means for Solving Problem

The present inventors have conducted intensive investigations, and as a result, have found out that the resistance to piercing or wear by activated carbon, inorganic particles or the like has a correlation with the molecular weight of the thermoplastic resin constituting the porous membrane layer of the hollow porous membrane, the number of porous membrane layers, and the bursting pressure of the hollow porous membrane, thereby completing the invention.

The hollow porous membrane of the invention has the following aspects.

[1] A hollow porous membrane having a plurality of porous membrane layers, at least two layers of which are formed using a thermoplastic resin (a) having a mass average molecular weight of 500,000 or more, and the hollow porous membrane having a bursting pressure of 200 kPa or more when an internal pressure is applied and exhibiting virus removal performance of LRV 4 or more in the case of using MS2 phage as a test bacterium.

[2] The hollow porous membrane according to [1], in which the thermoplastic resin (a) is polyvinylidene fluoride.

[3] The hollow porous membrane according to either [1] or [2], including a tubular support which include a multifilament, in which the plurality of porous membrane layers is laminated on an outer circumferential surface of the support.

[4] The hollow porous membrane according to [3], in which the tubular support which include a multifilament is a braid support formed by circular knitting into a cylindrical shape.

[5] The hollow porous membrane according to either [3] or [4], in which the multifilament is polyester.

[6] The hollow porous membrane according to any one of [3] to [5], in which a fineness of the multifilament is from 50 to 1000 dtex.

[7] The hollow porous membrane according to any one of [1] to [6], in which at least one layer of the layers formed using the thermoplastic resin (a) is formed using a mixture of plural kinds of thermoplastic resins having different molecular weights.

[8] The hollow porous membrane according to any one of [1] to [7], in which a mass average molecular weight of a thermoplastic resin (a) used in an outermost layer of the layers formed using thermoplastic resins (a) is greater than a mass average molecular weight of a thermoplastic resin (a) used in each of the other layers.

[9] The hollow porous membrane according any one of [3] to [6], in which the support is a heat treated support.

[10] The hollow porous membrane according to any one of [1] to [9], in which an outer diameter is from 1.0 to 5.0 mm.

[11] The hollow porous membrane according to [7], in which all of the plural kinds of thermoplastic resins have a mass average molecular weight of 400,000 or more.

[12] The hollow porous membrane according to any one of [1] to [11], in which a mass average molecular weight of a thermoplastic resin (a) used in an outermost layer of the layers formed using thermoplastic resins (a) is 600,000 or more.

[13] The hollow porous membrane according to any one of [1] to [12], in which a total membrane thickness of the plurality of porous membrane layers is 50 μm or more and 200 μm or less.

[14] The hollow porous membrane according to any one of [1] to [13], in which a water permeability is 8 m³/m²/hr/MPa or more.

[15] The hollow porous membrane according to any one of [1] to [14], in which an inner diameter is 0.6 mm or more.

[16] The hollow porous membrane according to any one of [1] to [15], in which all of the porous membrane layers are formed of a thermoplastic resin (a) having a mass average molecular weight of 500,000 or more.

Effect of the Invention

The hollow porous membrane of the invention exhibits the resistance to piercing of activated carbon, inorganic particles or the like into the membrane surface at the time of the air scrubbing process or the like or to wear of the membrane surface by these particles as well as exhibits high virus removal performance. Therefore, the hollow porous membrane can maintain high virus removal performance and can stably supply favorable treated water.

MODE(S) FOR CARRYING OUT THE INVENTION

Hereinafter, the invention will be described in detail.

<Hollow Porous Membrane>

The hollow porous membrane of the invention is a hollow porous membrane having a plurality of porous membrane layers, and at least two layers of the porous membrane layers are formed using a thermoplastic resin (a) having a mass average molecular weight of 500,000 or more. In addition, the hollow porous membrane of the invention has a bursting pressure of 200 kPa or more in a case in which an internal pressure is applied and exhibits virus removal performance of LRV 4 or more in the case of using MS2 phage as a test bacterium.

Here, the bursting pressure when an internal pressure is applied means the air pressure when the air pressure is gradually applied to the inside (hollow portion) of the hollow porous membrane and thus the membrane is burst. Specifically, the bursting pressure is measured by the following method using, for example, a sample prepared by sealing one end of the hollow porous membrane cut to have a length of 4 cm with a polyurethane resin.

First, the sample is immersed in ethanol (25° C.). On the other hand, the container is prepared. The other end of the sample (that is, the open end portion of the sample which is not sealed with a polyurethane resin) and the container are then connected with a tube, the internal pressure is gradually applied to the container with the compressed air so that the pressure is applied to the hollow portion of the sample. Thereafter, the pressure value is measured when the membrane of the sample is burst. This measurement is conducted three times, and the minimum value of the measured three pressure values is adopted as the bursting pressure of the hollow porous membrane.

In addition, a method of measuring the virus removal performance in the case of using the MS2 phage as the test bacteria is as follows although the details will be described below. The *Escherichia coli* phage MS2 (particle size of about 25 nm) as the test bacteria is grown in *E. coli* to a $10^6$ pfu/ml order and the pH thereof is adjusted to 7 with 0.1 mM phosphate buffer, and this is used as the test solution. Thereafter, the non-destructive removal performance test to be described below is performed. The LRV of an indicator of the removal performance is calculated from this result.

To be LRV 4 or more indicates that 99.99% or more of the shed test bacteria are blocked. It is desirable that the virus removal performance is LRV 4 or more and it is more preferable to be LRV 4.5 or more since it is also stated in the "National primary drinking water standards" of the United States Environmental Protection Agency (USEPA) that it is required to remove the virus by 99.99% or more in order to utilize the surface water as the drinking water.

The membrane surface of such a hollow porous membrane is hardly worn by the activated carbon or inorganic particles, in a situation that the hollow porous membrane is used together with the activated carbon in various kinds of water treatment or inorganic particles such as sand are contained in the water to be treated, even in a case in which the membrane is shaken by the air scrubbing process and thus the activated carbon or the inorganic particles are inserted between the membranes. In addition, these particles hardly pierce into the membrane surface. Hence, an increase in pore size caused by the wear and plastic deformation of the membrane surface hardly occurs although the air scrubbing process is repeatedly performed. In addition, the defective point due to piercing of the particles in the air scrubbing process hardly occurs and thus it is possible to maintain high virus removal performance. Hereinafter, in a case in which the "defective point" is simply described in the present specification, the defective point means a defective point caused by the air scrubbing process or the like.

Specifically, the wear resistance of the porous membrane layer is enhanced by forming the porous membrane layer using a thermoplastic resin (a) having a mass average molecular weight of 500,000 or more, the plastic deformation of the membrane surface due to wear is thus suppressed, and eventually an increase in pore size due to the plastic deformation can be prevented.

In addition, by forming two or more layers of such a porous membrane layer, it is possible to maintain the virus removal performance by the layer on the inner side even if the layer on the outer side of these layers is worn so that the pore size is increased and thus the virus removal performance decreases.

Moreover, it is difficult for the activated carbon and the inorganic particles to pierce into the membrane surface of the hollow porous membrane when the bursting pressure of the hollow porous membrane is 200 kPa or more and thus the defective point is hardly generated.

Here, the defective point is easily generated as the activated carbon or the inorganic particles pierce in a case in which the bursting pressure at the time of applying the internal pressure is less than 200 kPa even when at least two layers of the porous membrane layers are formed using a thermoplastic resin (a) having a mass average molecular weight of 500,000 or more. On the other hand, it is not possible to sufficiently suppress a decrease in virus removal performance due to the wear of membrane surface in a case in which the porous membrane layer formed using a thermoplastic resin (a) having a mass average molecular weight of 500,000 or more is one layer or less even when the bursting pressure at the time of applying the internal pressure is 200 kPa or more.

As a result, the requirement that the virus removal performance in the case of using the MS2 phage as the test bacteria is LRV 4 or more is not satisfied in these cases.

The mass average molecular weight of the thermoplastic resin (a) used in the formation of the porous membrane layer is preferably 600,000 or more. The upper limit value of the mass average molecular weight is not particularly limited but is preferably 3 million and more preferably 2 million since the discharge pressure at the time of producing the membrane significantly increases when the mass average molecular weight is too high and thus the formativeness deteriorates.

The bursting pressure of the hollow porous membrane is preferably 220 kPa or more. The upper limit value of the bursting pressure is not particularly limited but is practically 1000 kPa in terms of production.

It is possible to use, for example, one or more kinds of polyvinylidene fluoride, polysulfone, polyacrylonitrile, polyimide, and the like as the thermoplastic resin (a). Among them, polyvinylidene fluoride is preferable in terms of the heat resistance or the excellent resistance to a chemical, such as a hypochlorite, for cleaning the hollow porous membrane.

Plural kinds of resins different in kind and molecular weight may be used by mixing as the thermoplastic resin (a), and the mass average molecular weight as a mixture may be 500,000 or more in that case. However, it is preferable that all of the plural kinds of thermoplastic resins before mixing have a mass average molecular weight of 400,000 or more since the defective point is easily locally generated in the porous membrane layer formed of the mixture when the molecular weight distribution of the mixture extends to the low molecular weight side.

In a case in which a thermoplastic resin (1) having a mass average molecular weight of $(Mw)_1$ and a thermoplastic resin (2) having a mass average molecular weight of $(Mw)_2$ are mixed in a mass ratio of $w_1:w_2$ (provided that, $w_1+w_2=1$) and this mixture is used as the thermoplastic resin (a), the mass average molecular weight Mw as a mixture is determined by the following Equation (1) described in the "Nihon Reoroji Gakkaishi, Vol. 28 (2000), No. 3 p. 99-103."

[Math. 1]

$$Mw=w_1(Mw)_1+w_2(Mw)_2 \qquad (1)$$

In the porous membrane layer formed using a thermoplastic resin (a) having a mass average molecular weight of 500,000 or more, a hydrophilic polymer such as polyvinylpyrrolidone may be added to the membrane forming solution as a component other than the thermoplastic resin (a) for the purpose of adjusting the viscosity of the membrane forming solution. However, the added hydrophilic polymer is removed in the manufacturing process of the hollow porous membrane, and thus the hydrophilic polymer usually does not remain in the finally obtained hollow porous membrane.

The number of layers of the porous membrane layer formed using the thermoplastic resin (a) having a mass average molecular weight of 500,000 or more is not particularly limited as long as it is two or more layers, but two to four layers are preferable since the manufacturing process is extended and complicated as the number of layers increases.

In addition, it is easy to control the bursting pressure of the hollow porous membrane at 200 kPa or more when the number of layers of the porous membrane layer formed using the thermoplastic resin (a) having a mass average molecular weight of 500,000 or more is two or more layers, and it is easier to control the bursting pressure of the hollow porous membrane at 200 kPa or more when the mass average molecular weight of the thermoplastic resin (a) used in the layer on the outermost side among the layers formed using the thermoplastic resin (a) is greater than the mass average molecular weight of the thermoplastic resin (a) used in each of the other layers. In addition, it is far easier to control the bursting pressure of the hollow porous membrane at 200 kPa or more when the mass average molecular weight of the thermoplastic resin (a) used in the layer on the outermost side is more preferably 600,000 or more and even more preferably 700,000 or more in that case.

The bursting pressure of the hollow porous membrane is affected by the mass average molecular weight of the thermoplastic resin for forming the porous membrane layer as described above, and it also depends on the concentration of resin (concentration of solid contents) in the membrane forming solution when producing the hollow porous membrane; the membrane structure such as a homogeneous structure or a heterogeneous structure; the thickness of membrane (membrane thickness); and the like in addition to that and the bursting pressure can also be controlled by adjusting these. Among these, the bursting pressure tends to be greatly affected by the mass average molecular weight of the thermoplastic resin for forming the porous membrane layer.

In addition, the hollow porous membrane may be furnished with a support (support for hollow porous membrane) such as a braid support formed by circular knitting a multifilament into a tubular shape such as a cylindrical shape, and there is a tendency that the bursting pressure is easily controlled at 200 kPa or more by being furnished with such a support.

As a preferred embodiment of the invention, a hollow porous membrane is mentioned which is furnished with a support and in which all of the porous membrane layers laminated on the outer circumferential surface of the support are formed of a thermoplastic resin (a) having a mass average molecular weight of 500,000 or more.

Examples of the material for the multifilament used in the production of the support may include a synthetic fiber, a semisynthetic fiber, a regenerated fiber, and a natural fiber. The multifilament may be formed by combining plural kinds of fibers.

Examples of the synthetic fiber may include a polyamide fiber such as nylon 6, nylon 66, and aromatic polyamide; a polyester-based fiber such as polyethylene terephthalate, polybutylene terephthalate, polylactic acid, and polyglycolic acid; an acrylic fiber such as polyacrylonitrile; a polyolefin-based fiber such as polyethylene and polypropylene; a polyvinyl alcohol-based fiber; a polyvinylidene-based chloride fiber; a polyvinyl chloride-based fiber; a polyurethane-based fiber; a phenolic resin-based fiber; a fluorine-based fiber such as polyvinylidene fluoride and polytetrafluoroethylene; and a polyalkylene paraoxybenzoate-based fiber.

Examples of the semisynthetic fiber may include a cellulose derivative-based fiber using cellulose diacetate, cellulose triacetate, chitin, and chitosan as a raw material; and a protein-based fiber referred to as promix. Examples of the regenerated fiber may include a cellulose-based regenerated fiber (rayon, cupra, polynosic, and the like) which is obtained by a viscose process, the cuprammonium process, or an organic solvent process. Examples of the natural fiber may include flax and jute.

Among these materials, a polyester-based fiber, an acrylic fiber, a polyvinyl alcohol-based fiber, a polyamide-based fiber or a polyolefin-based fiber which is excellent in chemical resistance is preferable and particularly a polyester-based fiber is more preferable since the hollow porous membrane is often subjected to a chemical cleaning using a hypochlorite and the like.

The fineness of the multifilament is preferably from 50 to 1000 dtex and more preferably from 100 to 400 dtex in terms of the rupture strength of the hollow porous membrane or ease of the outer diameter control.

The total thickness of all of the porous membrane layers constituting the hollow porous membrane, that is the total membrane thickness of the porous membrane layers (not including the thickness of support.) is preferably 50 μm or more and 200 μm or less and more preferably 60 μm or more and 150 μm or less from the viewpoint of the resistance to wear of the membrane surface or to piercing of the particles into the membrane surface, the viewpoint of the water permeability, and the viewpoint of the bursting pressure of the hollow porous membrane. When the total membrane thickness of the porous membrane layers is less than 50 μm, the water permeability is improved since the resistance to filtration decreases but there is a tendency that the resistance to wear of the membrane surface or to piercing of the particles into the membrane surface decreases and also the virus trapping ability (depth filtration ability) in the micropores or the membrane production stability easily decreases. On the other hand, when the total membrane thickness of the porous membrane layers is more than 200 μm, the resistance to wear of the membrane surface or to piercing of the particles into the membrane surface is sufficient but a problem is caused that the resistance to filtration increases and thus the water permeability decreases and the raw material cost increases.

The thickness of each of the porous membrane layers is preferably in the range of from 20 to 100 μm although it also depends on the total membrane thickness of the porous membrane layers or the total number of the porous membrane layers.

In addition, the outer diameter of the hollow porous membrane is preferably about from 1.0 to 5.0 mm and more preferably about from 1.2 to 3.0 mm from the viewpoint of maintaining the hollow shape against crushing. In addition, the inner diameter of the hollow porous membrane is preferably 0.6 mm or more and more preferably 0.7 mm or more from the viewpoint of suppressing the water permeability by the resistance in pipe.

Figure 5:
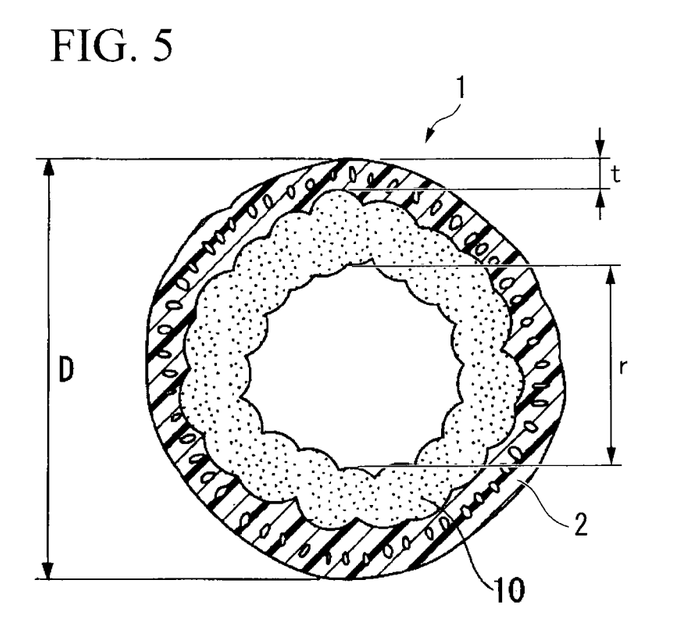
FIG. 5 is a cross-sectional diagram schematically illustrating an example of the hollow porous membrane of the invention.

Here, in FIG. 5, an example of the hollow porous membrane of the invention is illustrated in which a plurality of porous membrane layers is laminated on the outer circumferential surface of the support. In FIG. 5, the reference numeral 10 denotes the support, and the reference numeral 2 denotes the layer consisting of a plurality of porous membrane layers. The total membrane thickness t of the porous membrane layers, the inner diameter and outer diameter of the hollow porous membrane will be described with reference to FIG. 5.

In FIG. 5, the length denoted by the symbol D is an outer diameter D of the hollow porous membrane and a length denoted by the symbol r is the inner diameter r of the hollow porous membrane. The inner diameter r refers to the length of the line connecting the convex parts of the concavoconvex on the inner circumferential surface of the support 10 so as to perpendicularly intersect the axis line (center line) of the hollow porous membrane.

In FIG. 5, the length denoted by the symbol t is the total membrane thickness of the porous membrane layers. The total membrane thickness t is the length from the boundary between the layer 2 consisting of the porous membrane layer and the convex part of the concavoconvex on the outer circumferential surface of the support 10 to the outermost surface of the hollow porous membrane in the radial direction.

The total membrane thickness t of the porous membrane layers and the outer diameter D and inner diameter r of the hollow porous membrane can be measured by the following method.

First, several pieces of the hollow porous membranes are bundled, the hollow portion of each of the hollow porous membranes is filled with a polyurethane resin as well as the entire outside of the bundle is covered with the polyurethane resin, and the polyurethane resin is then cured. Subsequently, the cured bundle is sliced along the radial direction of the hollow porous membrane such that the length in the longitudinal direction thereof is about 0.5 mm so as to obtain a flaky sample having a thickness of about 0.5 mm. Subsequently, the optical image of the cross section of the sample is projected on the screen at a magnification of, for example, 100 times using a projector. The outer diameter D and inner diameter r of the hollow porous membrane and the total membrane thickness t of the porous membrane layers in the projected image are measured.

The operation in which the sample is cut and the measurement is conducted as described above is repeated three times, and the average values of the numerical values obtained by the three times of measurement are adopted as the outer diameter D and inner diameter r of the hollow porous membrane and the total membrane thickness t of the porous membrane layers.

The water permeability of the hollow porous membrane is preferably 8 $m^3/m^2/hr/MPa$ or more and more preferably 10 $m^3/m^2/hr/MPa$ or more. The membrane filtration operation is not affected even if the hollow porous membrane is worn and the membrane structure is plastically deformed and thus a decrease in water permeability occurs when the water permeability of the hollow porous membrane is 8 $m^3/m^2/hr/MPa$ or more.

<Method of Producing Hollow Porous Membrane>

The hollow porous membrane of the invention can be produced by employing a known method such as a method in which the membrane forming solutions for forming each of the porous membrane layers are respectively prepared and each of the membrane forming solutions are discharged from each of the discharge ports of the multi-pipe spinning nozzle into the coagulation bath containing the coagulating liquid and then coagulated.

The membrane forming solution is a liquid containing a resin which is a material of the porous membrane layer and a solvent. In other words, the membrane forming solution of the porous membrane layer formed using the thermoplastic resin (a) contains at least the thermoplastic resin (a) and a solvent.

Examples of the solvent may include N,N-dimethylformamide, N,N-dimethylacetamide, dimethyl sulfoxide, and N-methyl-2-pyrrolidone, and N,N-dimethylacetamide or N-methyl-2-pyrrolidone is preferable in terms that the water permeability of the porous membrane layer to be formed is high. A hydrophilic polymer such as polyvinylpyrrolidone may be added to the membrane forming solution for the purpose of adjusting the viscosity of the membrane forming solution and the like.

The concentration of resin in the membrane forming solution is preferably from 5 to 30% by mass and more preferably from 10 to 20% by mass from the viewpoint that a suitable porous membrane structure can be formed and also the bursting pressure of the hollow porous membrane is easily controlled at 200 kPa or more.

An aqueous solution containing the same solvent as the solvent of the membrane forming solution is preferable as the coagulating liquid. The concentration of solvent is preferably from 1 to 50% by mass in the coagulating liquid (100% by mass) and the temperature of the coagulating liquid is preferably from 50 to 90° C. in a case in which the solvent of the membrane forming solution is, for example, N,N-dimethylacetamide. In addition, the concentration of solvent is preferably from 1 to 50% by mass in the coagulating liquid (100% by mass) and the temperature of the coagulating liquid is preferably from 10 to 90° C. in a case in which the solvent of the membrane forming solution is N-methyl-2-pyrrolidone.

The hollow porous membrane can be produced by the method to be described below in a case in which the hollow porous membrane is furnished with a braid support formed by circular knitting a multifilament into a tubular shape and has a form in which a plurality of porous membrane layers are laminated on the outer circumferential surface of the braid support.

First, the braid support formed by circular knitting a multifilament into a tubular shape is produced. The braid support can be produced by the production method having the following (a) and (b) steps.

(a) A step of circular knitting a multifilament into a tubular shape.

(b) A step of heat treating the circular knitted tubular multifilament so as to contract.

Meanwhile, the circular knitting is to knit the tubular weft knitted fabric using a circular knitting machine, and the braid formed by circular knitting a multifilament into a cylindrical shape is one obtained by bending a multifilament so as to form a continuous loop extending helically and relating theses loops with one another in four quarters.

Figure 1:
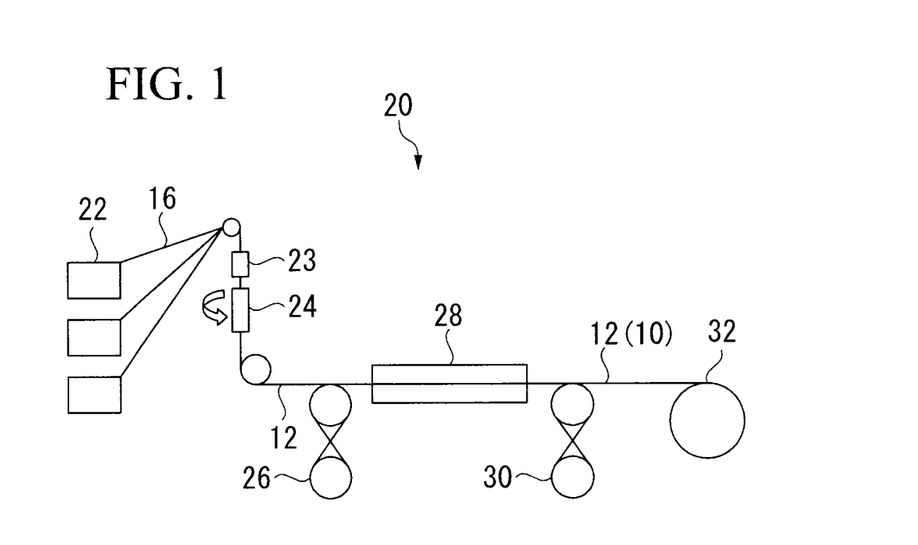
FIG. 1 is a schematic block diagram illustrating an example of a support producing apparatus.

The braid support can be produced using the support producing apparatus illustrated in FIG. 1, for example.

A support producing apparatus 20 in FIG. 1 is furnished with a plurality of bobbins 22, a circular knitting machine 24 to circularly knit a multifilament 16 drawn from the bobbin 22, a string supply device 26 to pull the braid support 12 knitted by the circular knitting machine 24 with a constant tension, a die 28 to heat treat the braid support 12, a withdrawing device 30 to withdraw the heat treated braid support 12, and a winder 32 to wind the braid support 12 onto the bobbin as a support 10.

Step (a):

In step (a), the braid support 12 is knitted by circular knitting the multifilament 16. The knitting speed is slightly changed depending on the shape of the braid support 12 but is substantially determined by the rotational speed of cylinder. The rotational speed of cylinder can be set to from 1 to 4000 rpm and is preferably from 100 to 3000 rpm in terms of being able to stably knit.

The braid support 12 that has been knitted in this manner exhibits elasticity due to its structure. Hence, in the next step (b), it is preferable to suppress the elasticity (outer diameter change) by subjecting the braid support 12 to the heat treatment using the die 28 so as to contract the braid support 12. In addition, the braid support 12 is hardly crushed by the heat treatment.

Step (b):

In step (b), the braid support 12 which has been circular knitted by the circular knitting machine 24 is heat treated by the die 28. The die 28 is constituted to have a body consisting of a block, plate or the like which is made of a metal and has a through hole formed on both ends in the longitudinal direction and a heating means. Examples of the heating means may include a band heater, an aluminum cast-in heater.

The processing temperature in the die 28 also depends on the material of the multifilament 16, but it is preferable to perform the heat treatment at (Tm—80° C.) or higher and Tm or lower when the melting point (or glass transition temperature) of the material is denoted as Tm. The processing temperature is usually preferably from 180 to 250° C. and more preferably from 190 to 230° C., for example, in a case in which the material of the multifilament 16 is a polyester-based fiber.

Meanwhile, there are three bobbins 22 in the illustrated example, but the bobbin may be one or four or more. In addition, the multifilament 16 may be supplied from a plurality of bobbins 22 and then doubled. It is possible to supply the multifilament having desired fineness and a desired number of filaments by doubling. The properties of the braid support 12 may be changed by doubling the multifilaments 16 having different properties such as heat shrinkability even when the kind of the multifilaments 16 is the same or by doubling the multifilaments 16 of different kinds. Meanwhile, it is required to provide a tension adjusting device 23 for every multifilament when doubling the multifilaments 16 in order to properly carry out the tension management as well.

In addition, the string supply device 26 may not be installed in a case in which the thermal shrinkage rate of the multifilament 16 is small. In this case, a dancer roll or the like is disposed between the circular knitting machine 24 and the die 28 so that the tension may be constantly held by the thermal contraction of the braid support 12.

Next, the porous membrane layer is formed on the outer circumferential surface of the support produced as described above in the following manner. In the case of forming two layers of the porous membrane layer formed using the thermoplastic resin (a) having a mass average molecular weight of 500,000 or more, for example, the porous membrane layer can be produced by a method having the following steps of (i) to (vii).

(i) A step of coating the first membrane forming solution in which the thermoplastic resin (a) having a mass average molecular weight of 500,000 or more is dissolved on the outer circumferential surface of the support.

(ii) A step of obtaining the hollow porous membrane precursor by coagulating the first membrane forming solution coated on the support so as to form the first porous membrane layer.

(iii) A step of coating the second membrane forming solution in which the thermoplastic resin (a) having a mass average molecular weight of 500,000 or more is dissolved on the outer circumferential surface of the hollow porous membrane precursor.

(iv) A step of obtaining the hollow porous membrane by coagulating the second membrane forming solution coated on the hollow porous membrane precursor so as to form the second porous membrane layer.

(v) A step of washing the hollow porous membrane.

(vi) A step of drying the hollow porous membrane.

(vii) A step of winding the hollow porous membrane.

Figure 2:
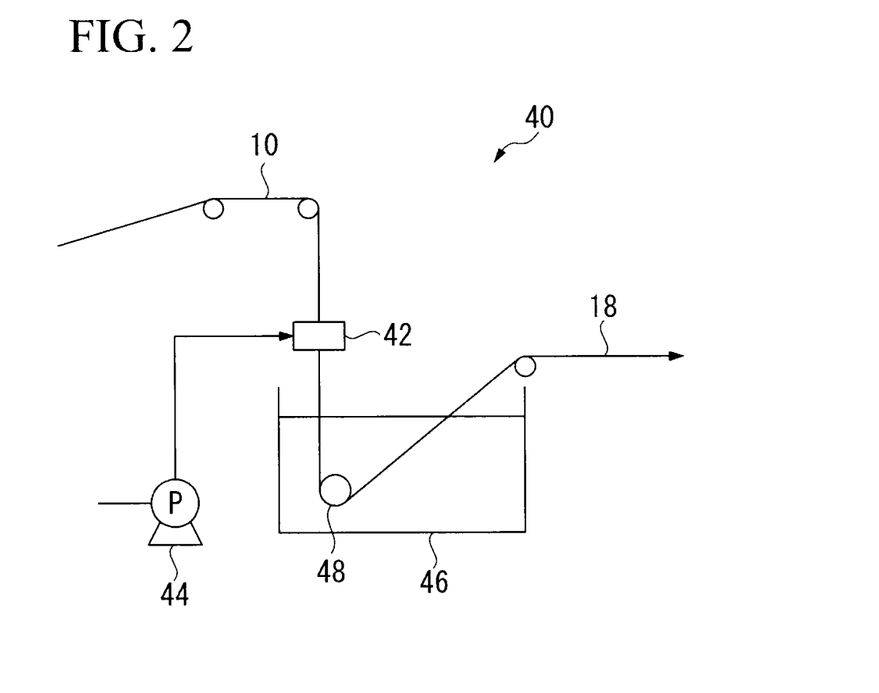
FIG. 2 is a schematic block diagram illustrating an example of a hollow porous membrane producing apparatus.

FIG. 2 is a schematic block diagram illustrating an example of a hollow porous membrane producing apparatus used in the steps (i) and (ii). A hollow porous membrane producing apparatus 40 is furnished with a double pipe spinning nozzle 42 to continuously coat the membrane forming solution on the support 10 which is continuously supplied from the unwinding device (not illustrated), a stock solution supply device 44 to supply the membrane forming solution to the double pipe spinning nozzle 42, a coagulation bath 46 containing the coagulating liquid to coagulate the membrane forming solution coated on the support 10, and a guide roll 48 to continuously introduce the support 10 coated with the membrane forming solution into the coagulation bath 46.

Step (i):

A pipe line through which the support 10 passes is formed in the center of the double pipe spinning nozzle 42. In the middle of the pipe line, a slit-shaped discharge port for membrane forming solution is formed in the circumferential direction of the pipe line and thus the pipe line has a structure to discharge the membrane forming solution. The first membrane forming solution is supplied from the stock solution supply device 44 in a constant amount when the support 10 passes through the pipe line and the first membrane forming solution is coated on the outer circumferential surface of the support 10 so as to form a coating membrane having a predetermined membrane thickness.

The inner diameter of the pipe line of the double pipe spinning nozzle 42 is slightly greater than the outer diameter of the support 10, and there is a fixed gap between the inner circumferential surface of the pipe line of the double pipe spinning nozzle 42 and the support 10. The gap is determined by the thickness of the coating membrane, the viscosity of the membrane forming solution, the travelling speed of the support 10 and the like.

Step (ii)

The coating membrane of the first membrane forming solution is brought into contact with the coagulating liquid in the coagulating bath 46 and thus the first membrane forming solution is coagulated to form the first porous membrane layer, whereby the hollow porous membrane precursor 18 is obtained.

Meanwhile, the steps (v) to (vii) to be described below may also be performed between the step (ii) and the step (iii).

Steps (iii) and (iv):

The second membrane forming solution is coated on the outer circumferential surface of the hollow porous membrane precursor 18 using the same apparatus as the apparatus used in steps (i) and (ii) under the same conditions as in steps (i) and (ii) and the second porous membrane layer is formed so as to obtain the hollow porous membrane.

Step (v):

For example, the hollow porous membrane is washed in hot water at from 60 to 100° C. to remove the solvent, subsequently washed with a chemical liquid such as hypochlorous acid, and subsequently washed in hot water at from 60 to 100° C. to remove the chemical liquid.

Steps (vi) and (vii):

The hollow porous membrane is dried at 60° C. or higher and less than 110° C. for 1 minute or longer and less than 24 hours, and then wound onto a bobbin, a skein and the like.

The hollow porous membrane produced in this manner is a hollow porous membrane which does not have a defective point caused by the single fiber end of the yarn piecing portion or fiber breakage portion on the membrane.

Meanwhile, in the above description, a method is exemplified in which the porous membrane layer of the first layer and the porous membrane layer of the second layer are sequentially formed using the double pipe spinning nozzle 42, but the porous membrane layer of the first layer and the porous membrane layer of the second layer may be formed at the same time by discharging the membrane forming solutions of two different kinds at the same time using a triple pipe spinning nozzle instead of the double pipe spinning nozzle 42 and introducing this into the coagulation bath.

In addition, in the above description, a hollow porous membrane has been exemplified which is furnished with the support 10 and has the porous membrane layer formed on the outer circumferential surface of the support 10, and the production method thereof has been described. However, the hollow porous membrane of the invention may not be furnished with a support as long as at least two layers of the porous membrane layers thereof are formed using a thermoplastic resin (a) having a mass average molecular weight of 500,000 or more, and the bursting pressure thereof is 200 kPa or more when an internal pressure is applied, and further the virus removal performance thereof is LRV 4 or more in the case of using the MS2 phage as the test bacteria. In the case of producing the hollow porous membrane which is not furnished with a support, for example, a method is mentioned in which the membrane is produced by supplying the internal coagulating liquid but not the support to the pipe line provided for the support to pass through in the center of the double pipe spinning nozzle in step (i). An aqueous solution containing the same solvent as the solvent of the membrane forming solution is preferable as the internal coagulating liquid in this case.

In addition, in the above description, a hollow porous membrane having two layers of the porous membrane layer has been exemplified and the production method thereof has been described, but a method may be employed in which steps (iii) and (iv) are increased in number according to the number of layers in the case of producing a hollow porous membrane having three or more layers of porous membrane layer.

In addition, in the above description, the so-called non-solvent induced phase separation method has been exemplified and described as the method of forming the porous membrane layer, but, for example, a known thermally induced phase separation method may be employed.

As described above, the hollow porous membrane in which at least two layers of the porous membrane layers are formed using a thermoplastic resin (a) having a mass average molecular weight of 500,000 or more and of which the bursting pressure at the time of applying the internal pressure is 200 kPa or more exhibits the resistance to piercing of activated carbon, inorganic particles or the like into the membrane surface at the time of air scrubbing process or the like or to wear of the membrane surface by these particles and thus can maintain high virus removal performance.

EXAMPLES

In the following Examples, the values of various physical properties and the performance were measured and evaluated by the following methods.

(Outer Diameter and Inner Diameter of Hollow Porous Membrane and Membrane Thickness of Porous Membrane Layer)

With regard to the hollow porous membrane having a support, the outer diameter D of the hollow porous membrane, the total membrane thickness t of the porous membrane layers, and the inner diameter r of the hollow porous membrane were measured by the following method.

The sample of the hollow porous membrane having a support was cut to be about 10 cm. Several pieces of the sample after cutting were bundled, and the entire sample was covered with a polyurethane resin. The polyurethane resin was allowed to enter even the hollow portion of the support. A flake having a thickness (corresponding to the length in the longitudinal direction of the hollow fiber membrane) of about 0.5 mm was cut using a razor blade after the polyurethane resin was cured. Next, the optical image of the cross section of the cut flake was projected on the screen at a magnification of 100 times (objective lens) using a projector (PROFILE PROJECTOR V-12 manufactured by Nikon Corporation), the outer diameter D of the hollow porous membrane, the total membrane thickness t of the porous membrane layer, and the inner diameter r of the hollow porous membrane of the sample were read from the projected image. This measurement was repeated three times, and the average values of the measured numerical values were adopted as the outer diameter D of the hollow porous membrane, the total membrane thickness t of the porous membrane layers, and inner diameter r of the hollow porous membrane.

(Water Permeability)

The sample was prepared by cutting the hollow porous membrane so as to have a length of 4 cm and sealing one end of the cut hollow porous membrane with a polyurethane resin. The sample was immersed in ethanol and an operation to lower the pressure inside the hollow porous membrane was performed for 5 minutes or longer, and then the sample was immersed in pure water so as to replace the inside of the micropore portion with pure water.

Subsequently, a container containing pure water (25° C.) was prepared, the other end of the sample (that is, the open end portion which is not sealed with a polyurethane resin) and the container were connected with a tube, and an air pressure of 100 kPa was applied into the container so as to allow pure water to flow out from the pore of the sample. The amount of pure water which had flowed out from the pore in this manner was measured for 1 minute. This measurement was conducted three times and the average value thereof was determined. The value obtained by dividing this value by the surface area of the sample and converting to the pressure of 1 MPa was adopted as the water permeability of the hollow porous membrane.

(Bursting Pressure)

The sample was prepared by cutting the hollow porous membrane so as to have a length of 4 cm and sealing one end of the cut hollow porous membrane with a polyurethane resin. The sample was immersed in ethanol (25° C.), the other end of the sample and the prepared container were connected with a tube, the internal pressure was gradually applied to the container by the compressed air, and the pressure value when the sample burst was measured. This measurement was conducted three times, and the minimum value of the pressure values obtained by the three times of measurement was adopted as the bursting pressure of the hollow porous membrane.

(Air Scrubbing Test)

The hollow porous membrane which had been cut to have a length of 35 cm was bundled as many so that the surface area thereof was 280 $cm^2$, one end of the bundle was sealed with a polyurethane resin, and the resultant was used as the sample (α).

The sample (α) was immersed in a container containing pure water (25° C.), and a tube was connected to the unsealed end portion of the sample (α), and then the internal pressure was applied to the sample (α) by the air of 100 kPa through the tube. At this time, the generation of bubbles from the sample (α) was not observed. In this manner, it was confirmed that there is no defective point on the sample (α) before the air scrubbing test.

Figure 3:
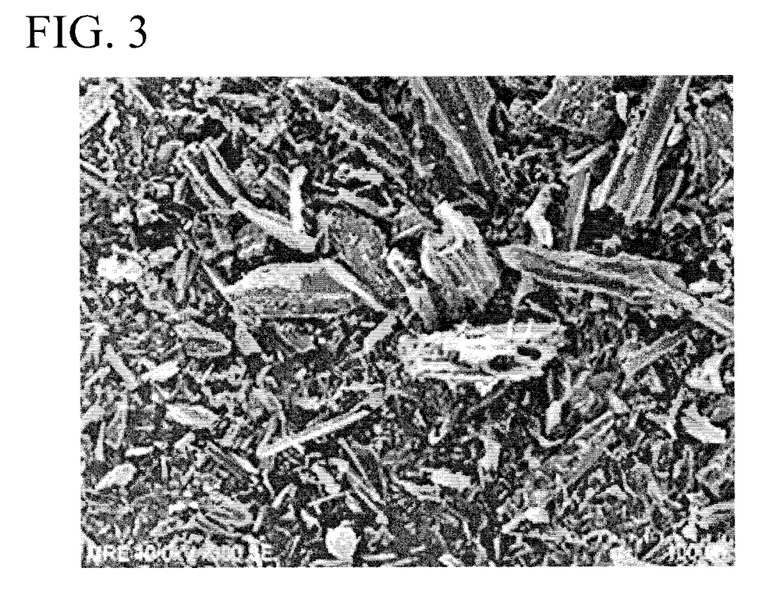
FIG. 3 is an electron microscope photograph of the activated carbon used in an air scrubbing test.

On the other hand, a container having a capacity to sufficiently contain this sample (α) was filled with pure water, wood-based activated carbon (picahydroMP23 Pica USA, Inc) illustrated in FIG. 3 was then added into the pure water so as to have a concentration of 6000 ppm, whereby an activated carbon dispersion was prepared. The sample (α) was immersed in ethanol and an operation to lower the pressure inside the hollow porous membrane was performed for 5 minutes or longer, and then the sample (α) was immersed in pure water so as to replace the inside of the micropore portion with pure water. Thereafter, the sample (α) was immersed in the activated carbon dispersion. The air of 35 Nm³/m²/hr was continuously supplied from the bottom of the container containing the activated carbon dispersion for 35 days, thereby performing the air scrubbing test.

Meanwhile, the wood-based activated carbon described above has a sharp shape and thus easily pierces into the membrane. Hence, it can be considered that the membrane which is not pierced by the activated carbon by the air scrubbing test using the wood-based activated carbon is also not pierced by other kinds of activated carbon or the inorganic particles such as sand and kaolin.

(Presence or Absence of Defective Point after Air Scrubbing Test)

A container containing pure water (25° C.) was prepared in the same manner as in the confirmation before the air scrubbing test. The sample (α) after the air scrubbing test above was immersed in the container, and a tube was connected to the unsealed end portion of the sample (α), and then the internal pressure was applied to the sample (α) by the air of 100 kPa through the tube. At this time, the presence or absence of bubbles generated from the sample (α) was visually confirmed, and the presence or absence of the defective point on the sample (α) after the air scrubbing test was examined by the confirmation.

(Virus Removal Performance)

The *Escherichia coli* phage MS2 (particle size of about 25 nm) as the test bacteria was grown in *E. coli* to a $10^6$ pfu/ml order, the pH thereof was adjusted to 7 with 0.1 mM phosphate buffer, and this was used as the test solution. Thereafter, the virus removal performance of the hollow porous membrane was evaluated by the following non-destructive test.

(1) Virus Removal Performance after Air Scrubbing Test

Both end portions of the above sample (α) used in the air scrubbing test were cut off, the bundled hollow porous membranes were once separated from one another. Thereafter, 15 pieces among those were bundled again and bent into a U shape. On the other hand, a tubular case having one open end was prepared. Thereafter, the hollow porous membrane was fixed in the tubular case using a polyurethane resin such that the openings at both ends of the hollow porous membrane which had been bent into a U shape were maintained. Thereafter, 1000 ml of the phage solution was supplied into the tubular case through the holes provided on the wall of the tubular case by applying a pressure of 20 kPa, the phage solution was filtered through the hollow porous membrane by out-in. The filtrate was then withdrawn through the open end portion of the hollow porous membrane, and 20 ml of its final flow was sampled. The MS2 of the test solution and the sampled filtrate were respectively quantified, the MS2 phage removal performance after the air scrubbing test was then calculated by the following Equation (2).

Meanwhile, it has been known that the virus removal performance significantly decreases in a case in which the defective point is generated, and thus the evaluation on the virus removal performance after the air scrubbing test was performed only for the sample which does not have a defective point confirmed after the air scrubbing test.

(2) Virus Removal Performance Before Air Scrubbing Test

The MS2 phage removal performance before the air scrubbing test was also calculated in the same manner as the method described above except using the hollow porous membrane which had not been subjected to the air scrubbing test.

$$\text{Removal Performance Value(LRV)} = -\log 10[1-\{MS2 \text{ in test solution} - MS2 \text{ in filtrate}\}/MS2 \text{ in test solution}] \quad \text{[Math. 2]}$$

Example 1

In the following manner, a hollow porous membrane was produced in which two layers of the porous membrane layer composed of polyvinylidene fluoride having a mass average molecular weight of 500,000 or more were formed on the outer circumferential surface of the braid support formed by circular knitting a multifilament into a cylindrical shape, of which the bursting pressure was 200 kPa or more, and of which the virus removal performance was LRV 4 or more in the case of using MS2 phage as the test bacteria.

Meanwhile, a support formed by circular knitting a polyester multifilament having a fineness of 167 dtex into a cylindrical shape using a support producing apparatus illustrated in FIG. 1 was used as the braid support.

(Preparation of First Membrane Forming Solution)

The first membrane forming solution was obtained by stirring and mixing 12.9% by mass of polyvinylidene fluoride (mass average molecular weight: $6.8 \times 10^5$), 11.9% by mass of polyvinylpyrrolidone (mass average molecular weight: $4.0 \times 10^4$), and 75.2% by mass of N-methyl-2-pyrrolidone of the solvent at room temperature.

(Preparation of Second Membrane Forming Solution)

The second membrane forming solution was obtained by stirring and mixing 18.3% by mass of polyvinylidene fluoride (mass average molecular weight: $1.1 \times 10^6$), 8.3% by mass of polyvinylpyrrolidone (mass average molecular weight: $4.0 \times 10^4$), and 73.4% by mass of N-methyl-2-pyrrolidone of the solvent at room temperature.

(Production of Hollow Porous Membrane)

The hollow porous membrane was produced using the producing apparatus illustrated in FIG. 2.

The first membrane forming solution was coated on the outer circumferential surface of the braid support by allowing the braid support to pass through the pipe line in the center of the double pipe spinning nozzle as well as supplying the first membrane forming solution through the outer side thereof and then coagulated by introducing the resultant into the first coagulation bath filled with an aqueous solution of N-methyl-2-pyrrolidone (coagulating liquid) having a solvent concentration of 40% by mass and a temperature of 25° C., thereby forming the first porous membrane layer.

Subsequently, the second membrane forming solution was coated on the first porous membrane layer in the same manner as the first membrane forming solution and then coagulated by introducing the resultant into the second coagulation bath filled with an aqueous solution of N-methyl-2-pyrrolidone (coagulating liquid) having a solvent concentration of 30% by mass and a temperature of 61° C., thereby forming the second porous membrane layer.

A series of steps were repeated three times that this was immersed in the sodium hypochlorite solution which has a concentration of 13% by mass and is at room temperature, then allowed to stay in a water vapor atmosphere at 100° C., and further immersed in hot water at 90° C., whereby polyvinylpyrrolidone remaining in the membrane was washed and removed.

After washing, the moisture remaining in the membrane was evaporated by a drying furnace heated at 105° C. so as to dry the membrane, thereby obtaining the hollow porous membrane.

The hollow porous membrane thus obtained had an outer diameter: 1.56 mm, an inner diameter: 0.88 mm, a total membrane thickness of the porous membrane layers composed of polyvinylidene fluoride: 77 μm, a bursting pressure: 343 kPa, and a water permeability for pure water: 11.0 $m^3/m^2/hr/MPa$ as presented in Table 1. The defective point was not observed after the air scrubbing test. The virus removal performance (LRV) was 6.2 before the air scrubbing test and 5.4 after the test, respectively, and there was no significant decrease in the virus removal performance.

Example 2

In the following manner, a hollow porous membrane was produced in which two layers of the porous membrane layer composed of polyvinylidene fluoride having a mass average molecular weight of 500,000 or more were formed on the outer circumferential surface of the braid support formed by circular knitting a multifilament into a cylindrical shape, of which the bursting pressure was 200 kPa or more, and of which the virus removal performance was LRV 4 or more in the case of using MS2 phage as the test bacteria.

(Preparation of First Membrane Forming Solution)

The first membrane forming solution was obtained by stirring and mixing 12.9% by mass of polyvinylidene fluoride (mass average molecular weight: $6.8\times10^5$), 11.9% by mass of polyvinylpyrrolidone (mass average molecular weight: $4\times10^4$), and 75.2% by mass of N-methyl-2-pyrrolidone of the solvent at room temperature.

(Preparation of Second Membrane Forming Solution)

The second membrane forming solution was obtained by stirring and mixing 15.2% by mass of polyvinylidene fluoride (mass average molecular weight: $1.1\times10^6$), 8.6% by mass of polyvinylpyrrolidone (mass average molecular weight: $4\times10^4$), and 76.2% by mass of N-methyl-2-pyrrolidone of the solvent at room temperature.

(Production of Hollow Porous Membrane)

The hollow porous membrane was produced in the same manner as in example 1 except that the first membrane forming solution and second membrane forming solution described above were used and the concentration of the aqueous solution of N-methyl-2-pyrrolidone (coagulating liquid) in the first coagulation bath was 30% by mass and the temperature thereof was 25° C.

The hollow porous membrane thus obtained had an outer diameter: 1.59 mm, an inner diameter: 0.91 mm, a total membrane thickness of the porous membrane layers composed of polyvinylidene fluoride: 86 μm, a bursting pressure: 304 kPa, and a water permeability for pure water: 13.5 $m^3/m^2/hr/MPa$ as presented in Table 1. The defective point was not observed after the air scrubbing test. The virus removal performance (LRV) was 6.8 before the air scrubbing test and 5.9 after the test, respectively, and there was no significant decrease in the virus removal performance.

Example 3

In the following manner, a hollow porous membrane was produced in which two layers of the porous membrane layer composed of polyvinylidene fluoride having a mass average molecular weight of 500,000 or more were formed on the outer circumferential surface of the braid support formed by circular knitting a multifilament into a cylindrical shape, of which the bursting pressure was 200 kPa or more, and of which the virus removal performance was LRV 4 or more in the case of using MS2 phage as the test bacteria.

(Preparation of First Membrane Forming Solution)

The first membrane forming solution was obtained by stirring and mixing 11.1% by mass of polyvinylidene fluoride (mass average molecular weight: $6.8\times10^5$), 12.1% by mass of polyvinylpyrrolidone (mass average molecular weight: $4\times10^4$), and 76.8% by mass of N-methyl-2-pyrrolidone of the solvent at room temperature.

(Preparation of Second Membrane Forming Solution)

The second membrane forming solution was obtained by stirring and mixing 4.3% by mass of polyvinylidene fluoride (mass average molecular weight: $1.1\times10^6$), 10.2% by mass of polyvinylidene fluoride (mass average molecular weight: $6.8\times10^5$), 12.0% by mass of polyvinylpyrrolidone (mass average molecular weight: $4\times10^4$), and 73.5% by mass of N-methyl-2-pyrrolidone of the solvent at room temperature.

Meanwhile, as the second membrane forming solution, two kinds of polyvinylidene fluoride having different mass average molecular weights were used as described above. The mass average molecular weight of the mixture of these two kinds was calculated by Equation (1) to be $8.1\times10^5$.

(Production of Hollow Porous Membrane)

The hollow porous membrane was produced in the same manner as in example 2 using the first membrane forming solution and second membrane forming solution described above.

The hollow porous membrane thus obtained had an outer diameter: 1.60 mm, an inner diameter: 0.91 mm, a total membrane thickness of the porous membrane layers composed of polyvinylidene fluoride: 83 μm, a bursting pressure: 230 kPa, and a water permeability for pure water: 18.6 $m^3/m^2/hr/MPa$ as presented in Table 1. The defective point was not observed after the air scrubbing test. The virus removal performance (LRV) was 4.7 before the air scrubbing test and 4.2 after the test, respectively, and there was no significant decrease in the virus removal performance.

Comparative Example 1

In the following manner, a hollow porous membrane was produced in which one layer of the porous membrane layer composed of polyvinylidene fluoride having a mass average molecular weight of 500,000 or more was formed on the outer circumferential surface of the braid support formed by circular knitting a multifilament into a cylindrical shape and of which the bursting pressure was 200 kPa or more.

(Preparation of First Membrane Forming Solution)

The first membrane forming solution was obtained by stirring and mixing 18.3% by mass of polyvinylidene fluoride (mass average molecular weight: $1.1\times10^6$), 8.3% by mass of polyvinylpyrrolidone (mass average molecular weight: $4.0\times10^4$), and 73.4% by mass of N-methyl-pyrrolidone of the solvent at room temperature.

(Production of Hollow Porous Membrane)

The hollow porous membrane was produced using the producing apparatus illustrated in FIG. 2.

The first membrane forming solution was coated on the outer circumferential surface of the braid support by allowing the braid support to pass through the pipe line in the center of the double pipe spinning nozzle as well as supplying the first membrane forming solution through the outer side thereof and then coagulated by introducing the resultant into the first coagulation bath filled with an aqueous solution of N-methyl-2-pyrrolidone (coagulating liquid) having a solvent concentration of 30% by mass and a temperature of 60° C., thereby forming a membrane.

A series of steps were repeated three times that this membrane was immersed in the sodium hypochlorite solution which has a concentration of 13% by mass and is at room temperature, then allowed to stay in a water vapor atmosphere at 100° C., and further immersed in hot water at 90° C., whereby polyvinylpyrrolidone remaining in the membrane was washed and removed.

After washing, the moisture remaining in the membrane was evaporated by a drying furnace heated at 105° C. so as to dry the membrane, thereby obtaining the hollow porous membrane.

The hollow porous membrane thus obtained had an outer diameter: 1.50 mm, an inner diameter: 0.88 mm, a total membrane thickness (membrane thickness of one layer) of the porous membrane layer composed of polyvinylidene fluoride: 50 μm, a bursting pressure: 282 kPa, and a water permeability for pure water: 19.7 m$^3$/m$^2$/hr/MPa as presented in Table 1. The defective point was not observed after the air scrubbing test, but the virus removal performance (LRV) significantly decreased from 4.8 before the air scrubbing test to 2.3 after the test.

Comparative Example 2

In the following manner, a hollow porous membrane was produced in which two layers of the porous membrane layer composed of polyvinylidene fluoride having a mass average molecular weight of 500,000 or more were formed on the outer circumferential surface of the braid support formed by circular knitting a multifilament into a cylindrical shape and of which the bursting pressure was less than 200 kPa.

(Preparation of First Membrane Forming Solution)
The first membrane forming solution was obtained by stifling and mixing 15.0% by mass of polyvinylidene fluoride (mass average molecular weight: 6.8×10$^5$), 17.7% by mass of polyvinylpyrrolidone (mass average molecular weight: 4.0×10$^4$), and 67.3% by mass of N-methyl-2-pyrrolidone of the solvent at room temperature.

(Preparation of Second Membrane Forming Solution)
The second membrane forming solution was obtained by stirring and mixing 15.0% by mass of polyvinylidene fluoride (mass average molecular weight: 6.8×10$^5$), 17.7% by mass of polyvinylpyrrolidone (mass average molecular weight: 4.0×10$^4$), and 67.3% by mass of N-methyl-2-pyrrolidone of the solvent at room temperature.

(Production of Hollow Porous Membrane)
The hollow porous membrane was produced in the same manner as in example 1 using the first membrane forming solution and second membrane forming solution described above. However, an aqueous solution of N-methyl-2-pyrrolidone (coagulating liquid) having a solvent concentration of 30% by mass and a temperature of 55° C. was used in the first coagulation bath and an aqueous solution of N-methyl-2-pyrrolidone (coagulating liquid) having a solvent concentration of 30% by mass and a temperature of 59° C. was used in the second coagulation bath.

The hollow porous membrane thus obtained had an outer diameter: 1.66 mm, an inner diameter: 0.91 mm, a total membrane thickness (membrane thickness of one layer) of the porous membrane layers composed of polyvinylidene fluoride: 93 μm, a bursting pressure: 159 kPa, and a water permeability for pure water: 7.1 m$^3$/m$^2$/hr/MPa as presented in Table 1. The virus removal performance (LRV) was 2.0 before the air scrubbing test. In addition, the defective point was generated in the air scrubbing test. The bursting pressure is also affected by the manufacturing conditions of the hollow porous membrane as described above, and thus a hollow porous membrane having a bursting pressure of less than 200 kPa can be produced although it has two layers of the layer composed of the thermoplastic resin (a). In this case, the hollow porous membrane is in a state in which a defective point is easily generated since the bursting pressure thereof is less than 200 kPa although it has two layers of the layer composed of the thermoplastic resin (a), and thus a defective point is generated in the air scrubbing test.

Comparative Example 3

In the following manner, a hollow porous membrane was produced in which one layer of the porous membrane layer composed of polyvinylidene fluoride having a mass average molecular weight of 500,000 or more and one layer of the porous membrane layer composed of polyvinylidene fluoride having a mass average molecular weight of less than 500,000 were formed on the outer circumferential surface of the braid support formed by circular knitting a multifilament into a cylindrical shape and of which the bursting pressure was 200 kPa or more.

(Preparation of First Membrane Forming Solution)
The first membrane forming solution was obtained by stirring and mixing 23.5% by mass of polyvinylidene fluoride (mass average molecular weight: 3.9×10$^5$), 11.8% by mass of polyvinylpyrrolidone (mass average molecular weight: 4.0×10$^5$), and 64.7% by mass of N,N-dimethylacetamide of the solvent at room temperature.

(Preparation of Second Membrane Forming Solution)
The second membrane forming solution was obtained by stirring and mixing 19.0% by mass of polyvinylidene fluoride (mass average molecular weight: 6.8×10$^5$), 11.0% by mass of polyvinylpyrrolidone (mass average molecular weight: 4.0×10$^5$), and 70.0% by mass of N,N-dimethylacetamide of the solvent at room temperature.

(Production of Hollow Porous Membrane)
The hollow porous membrane was produced using the producing apparatus illustrated in FIG. 2. However, a triple pipe spinning nozzle was used instead of the double pipe spinning nozzle 42.

The first membrane forming solution and the second membrane forming solution were coated on the outer circumferential surface of the braid support in this order from the inner side by allowing the braid support to pass through the pipe line in the center of the triple pipe spinning nozzle as well as simultaneously supplying the first membrane forming solution and the second membrane forming solution through the outer side thereof and then coagulated by introducing the resultant into the first coagulation bath filled with an aqueous solution of N,N-dimethylacetamide (coagulating liquid) having a solvent concentration of 20% by mass and a temperature of 64° C., thereby forming a membrane.

A series of steps were repeated three times that this membrane was immersed in the sodium hypochlorite solution which has a concentration of 13% by mass and is at room temperature, then allowed to stay in a water vapor atmosphere at 100° C., and further immersed in hot water at 90° C., whereby polyvinylpyrrolidone remaining in the membrane was washed and removed.

After washing, the moisture remaining in the membrane was evaporated by a drying furnace heated at 105° C. so as to dry the membrane, thereby obtaining the hollow porous membrane.

The hollow porous membrane thus obtained had an outer diameter: 1.62 mm, an inner diameter: 0.88 mm, a total membrane thickness (membrane thickness of one layer) of the porous membrane layers composed of polyvinylidene fluoride: 98 µm, a bursting pressure: 242 kPa, and a water permeability for pure water: 19.8 m³/m²/hr/MPa as presented in Table 1. The virus removal performance (LRV) was 6.4 before the air scrubbing test. In addition, the defective point was generated in the air scrubbing test.

Comparative Example 4

In the following manner, a hollow porous membrane was produced in which two layers of the porous membrane layer composed of polyvinylidene fluoride having a mass average molecular weight of less than 500,000 were formed on the outer circumferential surface of the braid support formed by circular knitting 16 pieces of a 830 dtex multifilament into a cylindrical shape and of which the bursting pressure was 200 kPa or more.

(Preparation of First Membrane Forming Solution)

The first membrane forming solution was obtained by stirring and mixing 3.0% by mass of polyvinylidene fluoride (mass average molecular weight: $5.5 \times 10^5$), 2.0% by mass of polyvinylidene fluoride (mass average molecular weight: $2.5 \times 10^5$), 2.0% by mass of polyvinylpyrrolidone (mass average molecular weight: $1.3 \times 10^6$), and 93.0% by mass of N,N-dimethylacetamide of the solvent at room temperature. Meanwhile, two kinds of polyvinylidene fluoride having different mass average molecular weights were used as described above. The mass average molecular weight of the mixture of these two kinds was calculated by Equation (1) to be $4.3 \times 10^5$.

(Preparation of Second Membrane Forming Solution)

The second membrane forming solution was obtained by stirring and mixing 12.0% by mass of polyvinylidene fluoride (mass average molecular weight: $5.5 \times 10^5$), 8.0% by mass of polyvinylidene fluoride (mass average molecular weight: $2.5 \times 10^5$), 10.0% by mass of polyvinylpyrrolidone (mass average molecular weight: $1.3 \times 10^6$), and 70.0% by mass of N,N-dimethylacetamide of the solvent at room temperature. Meanwhile, two kinds of polyvinylidene fluoride having different mass average molecular weights were used as described above. The mass average molecular weight of the mixture of these two kinds was calculated by Equation (1) to be $4.3 \times 10^5$.

(Production of Hollow Porous Membrane)

The hollow porous membrane was produced in the same manner as in example 1 using the first membrane forming solution and second membrane forming solution described above. However, the first coagulation bath was filled with an aqueous solution of N,N-dimethylacetamide (coagulating liquid) having a solvent concentration of 5% by mass and a temperature of 80° C.

The hollow porous membrane thus obtained had an outer diameter: 2.72 mm, an inner diameter: 1.20 mm, a total membrane thickness of the porous membrane layers composed of polyvinylidene fluoride: 433 µm, a bursting pressure: 208 kPa, and a water permeability for pure water: 84.7 m³/m²/hr/MPa as presented in Table 1. Sufficient virus removal performance was not obtained as the virus removal performance (LRV) was 0.04 before the air scrubbing test.

TABLE 1

| | Number of layer composed of polyvinylidene fluoride | Mass average molecular weight of polyvinylidene fluoride | | Outer diameter mm | Inner diameter mm | Total membrane thickness µm | Water permeability m³/m²/hr/MPa | Bursting pressure kPa | Presence or absence of defective point after air scrubbing test | Virus removal performance | |
|---|---|---|---|---|---|---|---|---|---|---|---|
| | | First porous membrane layer | Second porous membrane layer | | | | | | | Before air scrubbing test LRV | After air scrubbing test LRV |
| Example 1 | 2 | $6.8 \times 10^5$ | $1.1 \times 10^6$ | 1.56 | 0.88 | 77 | 11.0 | 343 | Absence | 6.2 | 5.4 |
| Example 2 | 2 | $6.8 \times 10^5$ | $1.1 \times 10^6$ | 1.59 | 0.91 | 86 | 13.5 | 304 | Absence | 6.8 | 5.9 |
| Example 3 | 2 | $6.8 \times 10^5$ | $8.1 \times 10^5$ | 1.60 | 0.91 | 83 | 18.6 | 230 | Absence | 4.7 | 4.2 |
| Comparative Example 1 | 1 | $1.1 \times 10^6$ | — | 1.50 | 0.88 | 50 | 19.7 | 282 | Absence | 4.8 | 2.3 |
| Comparative Example 2 | 2 | $6.8 \times 10^5$ | $6.8 \times 10^5$ | 1.66 | 0.91 | 93 | 7.1 | 159 | Presence | 2.0 | — |
| Comparative Example 3 | 2 | $3.9 \times 10^5$ | $6.8 \times 10^5$ | 1.62 | 0.88 | 98 | 19.8 | 242 | Presence | 6.4 | — |
| Comparative Example 4 | 2 | $4.3 \times 10^5$ | $4.3 \times 10^5$ | 2.72 | 1.20 | 433 | 84.7 | 208 | — | 0.04 | — |

In the hollow porous membrane of each Example which has two layers of the porous membrane layer composed of polyvinylidene fluoride having a mass average molecular weight of 500,000 or more and a bursting pressure of 200 kPa or more, a defective point was not generated even by the air scrubbing test conducted in the presence of activated carbon and also the resistance to wear of the membrane surface by activated carbon was exhibited, and thus high virus removal performance was maintained.

Figure 4:
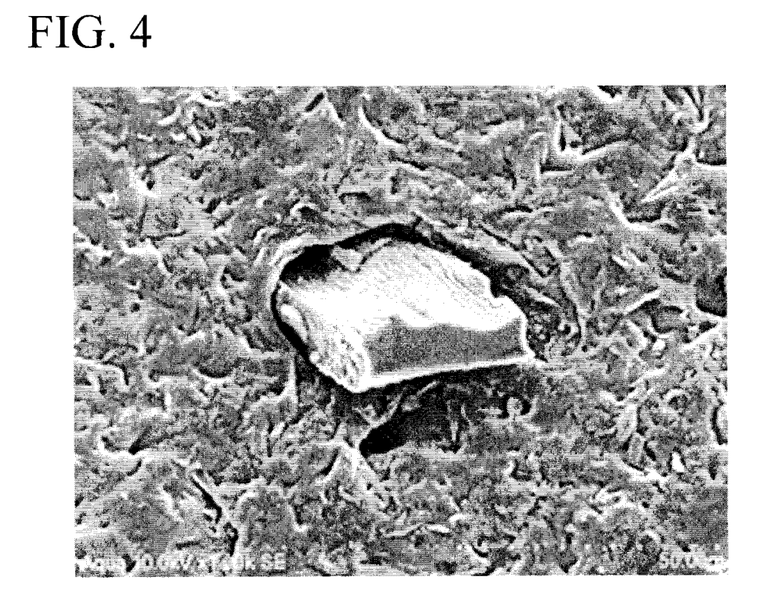
FIG. 4 is an electron microscope photograph of the hollow porous membrane (Comparative Example 3) after the air scrubbing test.

On the contrary to this, in the hollow porous membranes of Comparative Examples, a defective point was generated since the activated carbon pierced into the membrane by the air scrubbing test as illustrated in FIG. 4 or the virus removal performance decreased since the membrane surface was worn although a defective point was not generated.

INDUSTRIAL APPLICABILITY

The hollow porous membrane of the invention exhibits the resistance to piercing of activated carbon, inorganic particles or the like into the membrane surface at the time of air scrubbing process or the like or to wear of the membrane surface by these particles, and thus a defective point is hardly generated and high virus removal performance can be maintained. Consequently, according to the hollow porous membrane of the invention, it is possible to provide safe treated water having a low risk of residual virus and to suitably use the hollow porous membrane in the water treatment by the precise filtration and the ultrafiltration, such as the sewage and wastewater treatment or the water purification treatment. In addition, the hollow porous membrane is also suitable for the application in which the hollow porous membrane is used together with activated carbon since it is strong to wear due to the contact with inorganic substances and the like.

EXPLANATIONS OF LETTERS OR NUMERALS

10 support (support for hollow porous membrane)
12 braid support
16 multifilament
18 hollow porous membrane precursor
24 circular knitting machine
26 string supply device
28 die
30 withdrawing device
40 hollow porous membrane producing apparatus
42 double pipe spinning nozzle
46 coagulation bath

The invention claimed is:

1. A hollow porous membrane, comprising:
a plurality of porous membrane layers,
wherein
a mass average molecular weight of a thermoplastic resin (a) used in an outermost layer of the layers formed using thermoplastic resins (a) is greater than a mass average molecular weight of a thermoplastic resin (a) used in each of the other layers,
at least two layers of the plurality of porous membrane layers are formed using a thermoplastic resin (a) having a mass average molecular weight of 500,000 or more, and
the hollow porous membrane has a bursting pressure of 200 kPa or more when an internal pressure is applied and exhibiting virus removal performance of LRV 4 or more in the case of using MS2 phage as a test bacterium.

2. The hollow porous membrane according to claim 1, wherein the thermoplastic resin (a) is polyvinylidene fluoride.

3. The hollow porous membrane according to claim 1, further comprising:
a tubular support which comprises a multifilament,
wherein the plurality of porous membrane layers are laminated on an outer circumferential surface of the support.

4. The hollow porous membrane according to claim 3, wherein the support is a braid support formed by circular knitting into a cylindrical shape.

5. The hollow porous membrane according to claim 3, wherein the multifilament is polyester.

6. The hollow porous membrane according to claim 3, wherein the multifilament has a fineness of from 50 to 1000 dtex.

7. The hollow porous membrane according to claim 3, wherein the support is a heat treated support.

8. The hollow porous membrane according to claim 1, wherein at least one layer of the layers formed using the thermoplastic resin (a) is formed using a mixture of plural kinds of thermoplastic resins having different molecular weights.

9. The hollow porous membrane according to claim 8, wherein all of the plural kinds of thermoplastic resins have a mass average molecular weight of 400,000 or more.

10. The hollow porous membrane according to claim 1, wherein an outer diameter is from 1.0 to 5.0 mm.

11. The hollow porous membrane according to claim 1, wherein a mass average molecular weight of a thermoplastic resin (a) used in an outermost layer of the layers formed using thermoplastic resins (a) is 600,000 or more.

12. The hollow porous membrane according to claim 1, wherein a total thickness of the plurality of porous membrane layers is 50 μm or more and 200 μm or less.

13. The hollow porous membrane according to claim 1, wherein a water permeability is 8 $m^3/m^2/hr/MPa$ or more.

14. The hollow porous membrane according to claim 1, wherein an inner diameter is 0.6 mm or more.

15. The hollow porous membrane according to claim 1, wherein all of the porous membrane layers are formed of a thermoplastic resin (a) having a mass average molecular weight of 500,000 or more.

* * * * *